Figure 1:
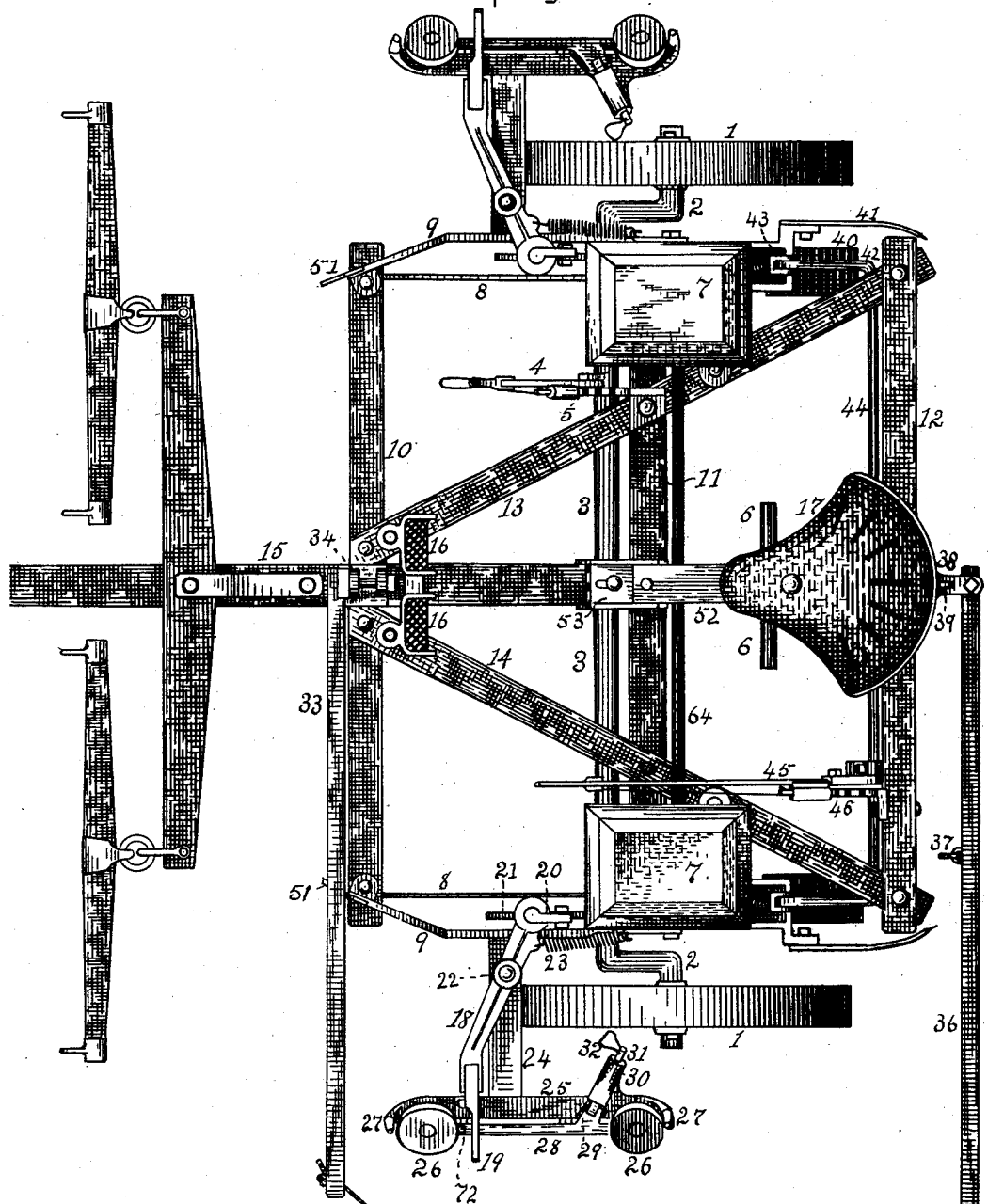

(No Model.) 3 Sheets—Sheet 1.

F. B. TAIT & J. GROSS.
CHECK ROW CORN PLANTER.

No. 367,463. Patented Aug. 2, 1887.

ATTEST
L. C. Hills,
W. S. Duvall

INVENTORS
F. B. Tait
John Gross
By E. B. Stocking
Atty.

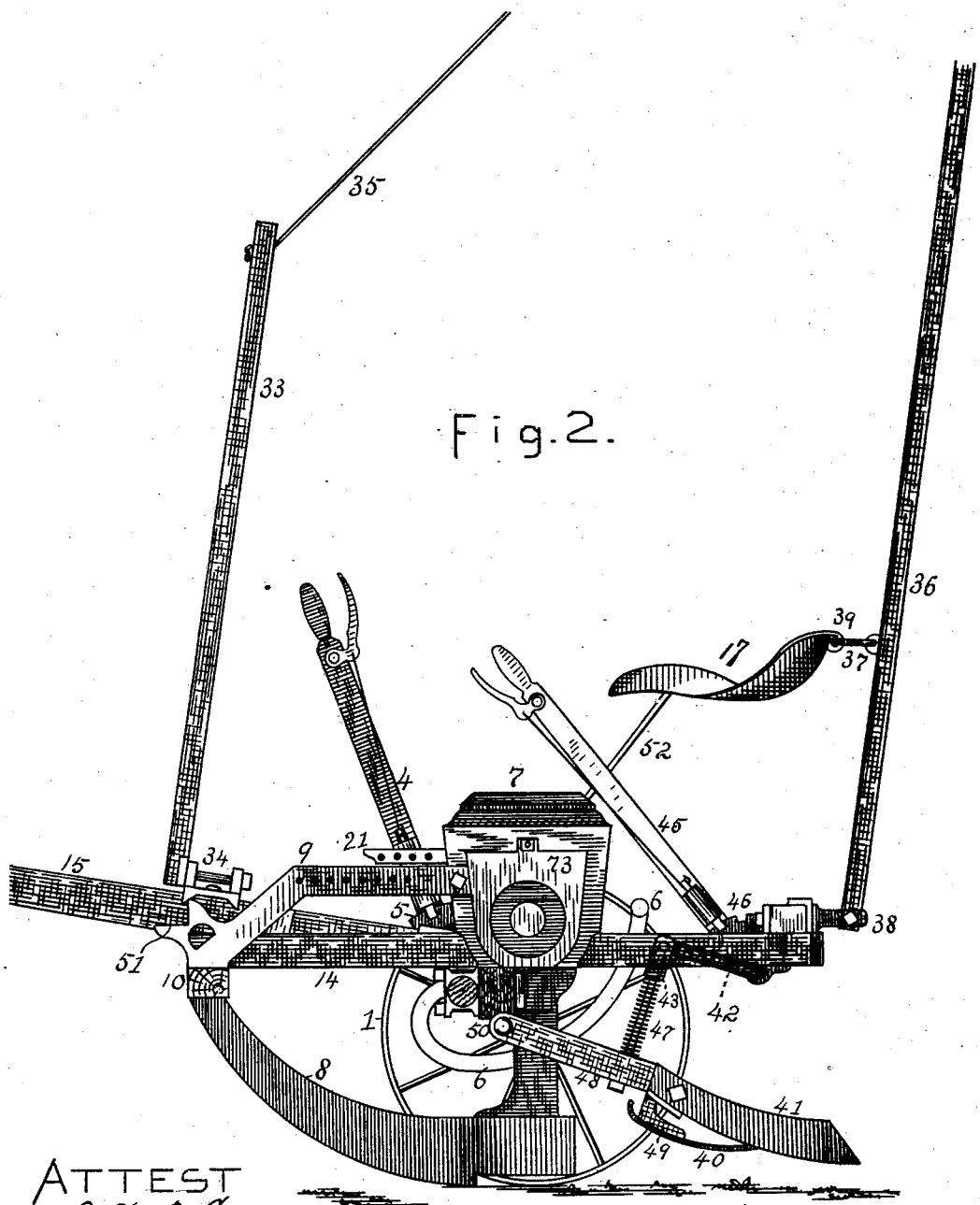

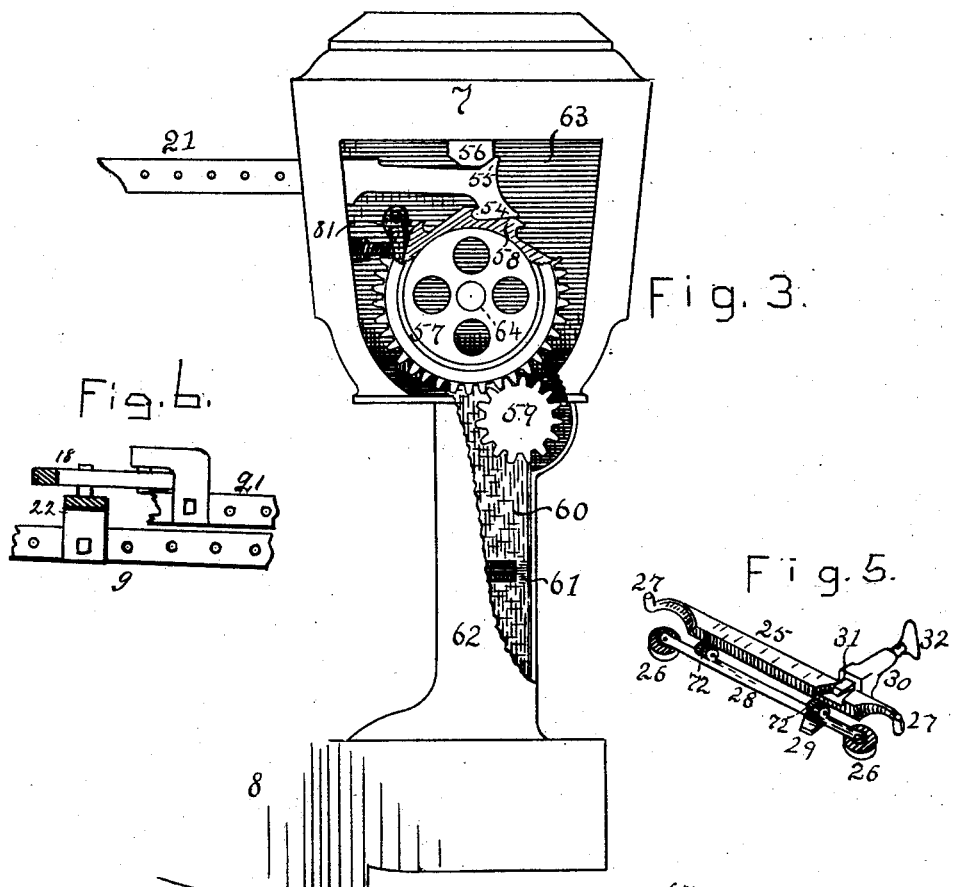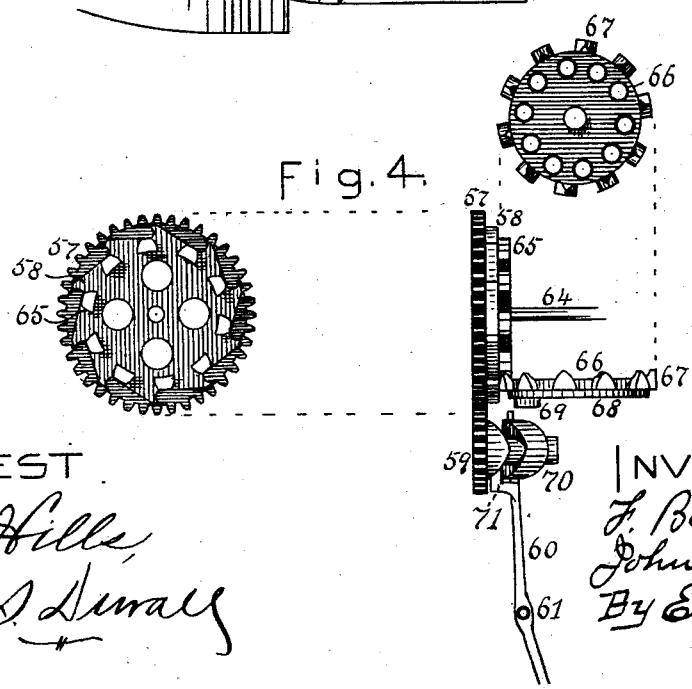

UNITED STATES PATENT OFFICE.

FELIX B. TAIT AND JOHN GROSS, OF DECATUR, ILLINOIS.

CHECK-ROW CORN-PLANTER.

SPECIFICATION forming part of Letters Patent No. 367,463, dated August 2, 1887.

Application filed March 11, 1887. Serial No. 230,487. (No model.)

*To all whom it may concern:*

Be it known that we, FELIX B. TAIT and JOHN GROSS, citizens of the United States, residing at Decatur, in the county of Macon, State of Illinois, have invented certain new and useful Improvements in Check-Row Corn-Planters, of which the following is a specification, reference being had therein to the accompanying drawings.

Our invention relates more particularly to corn-planters in which the dropping mechanism is operated by contact with stops on a line laid across the field adjacent to and parallel with the course of the planter; but the subsidiary devices that accomplish individual results (the sub-combinations of operative parts) may, with a few exceptions, be used in different general combinations, without reference to the manner in which the dropping mechanism is operated.

It is our object, first, to produce a corn-planter that will conform with readiness to the motions of the team, and by its sensitive responses to variations in direction make accurate driving easy of accomplishment; second, to permit the runners to be adjusted vertically without changing the horizontal relation of the check-row lever to the final drop of the planter, and so insure accuracy in checking while planting at various depths; third, to cover the corn with a pressure sufficiently firm to insure germination and to leave the covering ground in a friable condition suitable for the absorption of moisture; fourth, to enable the driver by a simple change of position to apply his weight either to hold the runners firmly in the ground at any desired depth or to raise said runners clear of the ground; fifth, to enable the driver to easily and quickly detach the check-row line from the planter while in position on his seat; sixth, to permit the guide-line-marking mechanism to be manipulated by the driver without dismounting; seventh, to apply the motion of the check-row levers in a simple and direct manner to the dropping mechanism of the planter; eighth, to permit adjustment of the check-row lever to neutralize the variation in planting caused by using variously-paced teams; ninth, to enable the driver to regulate the pressure of the covering mechanism on the ground, and, tenth, to use the supporting-wheels as positive guides to carry the runners uniformly at any desired depth of penetration, all of said objects being attained in a novel manner by means of the combinations, sub-combinations, details of construction, and relative arrangement of parts, hereinafter set forth in detail, and specifically claimed.

In the drawings accompanying and forming a part of this specification, Figure 1 is a plan of our machine, the marker, which has no points of patentable novelty, being omitted, and the marker-bar being shortened to bring the drawing to the required areal limits. Fig. 2 is a side elevation of the planter with the check-row device removed, the axle broken just back of the nearest crank, and the conditions concerning the marker the same as in Fig. 1. Fig. 3 is a side view of a seed-box and shank under conditions to show the construction of the dropping mechanism. Fig. 4 is a view of the dropping mechanism in skeleton, the important parts being projected in face view. Fig. 5 is a perspective view of the mechanism for detaching the check-row line from the planter. Fig. 6 is a detail in perspective, showing how the bifurcated lever is connected with the seed-dropping mechanism.

The frame comprises the parallel transverse bars 10 11 12 and the diagonal bars 13 14, extending from near the center of the front bar to the extremities of bar 12, crossing bar 11 and connecting with all the transverse bars by means of suitable bolts at all the points of intersection. The frame so constructed maintains a horizontal position while in operation, being so held by the tongue 15, which inclines upwardly from the transverse center of bar 11, connecting with bar 10 and resting lightly in the neck-yoke ring. On the outer ends of bar 11, adjacent to the diagonal bars, are the seed-boxes 7, suitably secured to the frame. Runners 8 connect with bar 10, and extend backward under the seed-boxes in the customary manner. The frame is supported by axle 3, that terminates at each end in cranks 2, which furnish bearings for wheels 1. A hand-lever, 4, with a suitable grip-catch, is rigidly attached to the axle, and a rack, 5, secured to the frame in position to co-operate with the catch of the lever, provides means for holding the lever at various points of adjustment. Auxiliary to lever 4 is bent arm 6, (see Fig. 2,) that projects forwardly from the axle, curves downwardly, backwardly, and upwardly in the order given and terminates in pedal under seat 17. Spring-support 52 carries seat 17, and bracket 53 provides means for adjusting the position of the seat, the support having longitudinal adjustment in the bracket, and the bracket having adjustment longitudinally on the tongue. At the vertex of the angle formed by the diagonal bars and bisected by the tongue are foot-rests 16, in position to utilize the bars and tongue to prevent lateral displacement of the feet. Extending from the seed-boxes forward and downward to the ends of bar 10 are brace-bars 9, that provide in their numerous perforations various points of attachment for the check-row mechanism. Bolted to each brace-bar is a bracket, 24, and on each bracket is a cross-arm, 25, carrying approximately-vertical guide-fingers 27. Pivoted to cross-arm 25, at points 72, (better seen in Fig. 5) is frame 28, carrying sheaves 26 and spur 29.

On cross-arm 25 is bearing 30, in which a spring-bolt, 31, has longitudinal motion. The end of the bolt contiguous to the spur of frame 28 is beveled, and its opposite end is provided with a hand-hold, 32. The marker-bar 36 is to be provided with a suitable marker, (not shown,) and is pivoted to the rear of the planter-frame at 38 in a manner permitting universal radial motion. A hook, 37, on the bar and an eye, 39, on the back of the seat enable the bar to be held vertically, as shown in Fig. 2. Bar 33, pivoted at 34, connects with the marker-bar by line 35, and rests ordinarily in an angle-brace, 51. Vertical pivots 22 on brackets 24 provide bearings for the check-row levers 18, and said levers have the customary bifurcated termination, 19, through which the check-row line operates. Adjustable plates 20, carrying suitable pivot-pins, connect the check-row levers each with a ratchet-bar, 21, that penetrates the seed-box and engages a ratchet-wheel, 58, as shown in Fig. 3. The inner termination of the ratchet-bar comprises the draw-catch 54, that engages the ratchet-teeth, and the projection 55, that strikes stop 56 and terminates the operation of the entire dropping mechanism. Integral with ratchet-wheel 58 is spur-wheel 57, which is broken in Fig. 3 to show said ratchet-wheels, and which meshes with the second drop spur pinion, 59. As shown in Fig. 4, the pinion carries cam-cylinder 70, and the second drop-valve, 60, is pivoted at 61, and receives oscillation from the cam-groove through point 71. On the inner face of ratchet-wheel 58 is crown-gear 65, that meshes with the teeth 67 of drop-plate 66, and imparts motion thereto. A plate, 68, with a single aperture, 69, provides for the discharge of the corn from the seed-plate, suitable cut-off mechanism (not shown) operating over the discharge-aperture in the customary manner.

Wheels 57 58 and ratchet-bar 21 operate in a recess in the side of the seed-box, partition 63, in Fig. 3, separating them from the corn, and plate 73 (seen in Fig. 2) acting as an outer casing therefor. A shaft, 64, traverses the planter and connects the ratchet-wheel of one seed-box with the ratchet-wheel of the other seed-box. The second drop-valves oscillate in the shanks 62. Springs 23 return the check-row levers to their shown positions after the termination of each stroke.

The covering mechanism comprises a frame, 48, pivoted at 50 to a planter-shank, a presser-foot, 40, secured to the frame through bracket 49, and a cutter, 41, laterally adjacent and rearwardly extended with reference to the presser-foot. The under surface of the presser-foot is transversely plane and longitudinally convex, and the knife is approximately vertical throughout its length and curved toward the path of the presser-foot at its rear termination. A shaft, 44, traverses the rear end of the planter-frame and terminates at each end in crank-arms 42, forwardly extended. Connected with each arm in a pivotal manner is a rod, 43, that penetrates the frame 48, and interposed between the frame and the head of the rod is a compression-spring, 47. A hand-lever, 45, with a suitable grip-catch, is rigidly attached to shaft 44, and a contiguous rack, 46, coacts with the catch to maintain the lever at different points of adjustment.

The axle traverses the planter-frame near the center of the frame and the cranks extended backwardly connect with the wheels to the rear of the center of gravity, causing the tongue to bear to some extent on the horses' necks. The wheels are laterally adjacent to the runners and act as guides to hold said runners uniformly at any required and previously-adjusted depth of penetration. In adjusting the runners to plant at different depths the entire frame is raised or lowered in a vertical line, and as a consequence there is no variation in the relative position of the various parts of the planting mechanism. This peculiarity is of importance in insuring accurate check-rows under all circumstances, as if the planter were adjusted to plant in check-rows at a certain depth and any adjustment changing the depth should throw the check-row mechanism forward or backward with relation to the final drop of the planter irregular planting would result.

In describing the motion of the planter in its depth-regulating adjustment as "vertical" absolute accuracy is not attained, as the front end of the tongue does not move and the planter really describes an arc, a few inches in length, of a circle having a diameter of twenty feet, which in practice does not vary perceptibly from a right vertical line. The vertical adjustment may be effected to any desired extent by using the hand-lever, with or without the foot-lever, to rotate the axle and carry the cranks in positions varying from the vertical to the horizontal, and the adjustment may be made secure by the catch on the hand-lever and the coacting rack. When the driver is in position on the seat, his weight tends to hold the runners firmly in the ground; but when he shifts his weight to the pedal of the foot-lever—a simple operation—he relieves the planting mechanism of his weight, which is placed where it will be most effective in raising the frame by being transferred to the axle and wheels.

The bar 33 rests against the vertical surface of angle-brace 51, and supports the marker-bar through line 35 in a manner permitting free vertical fluctuation to an extent sufficient to conform to variations in the surface of the ground.

When the end of the field is reached, the marker-bar is raised and held in a vertical position by the hook 37 and eye 39 until a turn is made, when the driving-lines are carried around bar 33 and the entire device is laid down on the opposite side of the planter. In this operation the line is carried clear of all obstructions by bar 33, which, as pivoted and lowered, will always rest in an angle-brace, 51.

The check-row wire or line is operated on opposite sides of the planter alternately. The check-row levers are thrown in one direction by the stops on the wire or line, and returned automatically by the springs 23. As a lever is thrown by the wire or line, it imparts motion to the first drop plate through bar 21, ratchet-wheel 58, and crown-gear 65, and to the second drop-valve through said bar, said ratchet-wheel, spur-wheel 57, pinion 59, and cam-cylinder 70, all in the order named; and the motion of the dropping mechanism of one seed-box is conveyed to the dropping mechanism of the other seed-box through shaft 64. At the termination of each operative throw of a check-row lever the stop 56 arrests the motion of the ratchet-bar, as shown in Fig. 3, and said bar in turn arrests the motion of the entire dropping mechanism by impeding the rotation of the ratchet-wheel. If desired, a spring-pawl, 81, may be used in connection with the ratchet 58 to prevent a backward motion of the same.

Variation in the speed of teams is compensated in the perforations of the supports 9 and draw-bars 21, which enable the levers to be set backward when a fast team is used, and set forward to accommodate the pace of a slow team.

The corn is covered with a degree of pressure regulated by the driver through lever 45, and such pressure is always imparted in a yielding manner through springs 47, so providing for slight irregularities in the surface of the ground. The presser-feet are curved to ride over the ground without penetration, and the cutters are curved slightly toward the paths of the presser-feet, in order that they may break the crust formed by the sliding friction and cover the same with loose soil.

The check-row wire or line is disconnected from the planter at the ends of the field preparatory to turning by withdrawing the bolt 31 from contact with the spur 29 of the pulley-frame, permitting the said frame to fall into the position shown in Fig. 5, the operation being performed by the driver on the seat.

It is apparent that our covering mechanism may comprise, instead of the presser-foot 40, a device which may have rotary motion while acting as a presser, and that our cutter 41 may be employed in connection therewith to perform its specific function of loosening the soil compressed by the device employed to perform the function of the presser-foot. In either case the cutter, or any well-known equivalent device, will secure the object of our invention in this regard, in that it will leave the covering ground in a condition suitable for the absorption of moisture.

We claim as new and desire to secure by Letters Patent—

1. The planter-frame comprising the three transverse bars, the diagonal bars extending from near the transverse center of the front bar to the ends of the rear bars, the boxes on the ends of the central bar, and the braces connecting the boxes with the ends of the front bar.

2. The planter-frame comprising the three transverse bars, the diagonal bars extending from near the transverse center of the front bar to the ends of the rear bars, the boxes on the ends of the central bar, the braces connecting the boxes with the ends of the front bar, the tongue connecting with the front and the central bars, and the foot-supports at the angles formed by the tongue and the diagonal bars.

3. In corn-planters, in combination, a rigid frame carrying planting mechanism and a driver's seat, an axle traversing the frame, crank-arms on the ends of the axle extended each in the same direction, wheels on the crank-arms alongside the dropping mechanism and slightly to the rear of the center of gravity of the frame and its load, a hand lock-lever on the axle in reach of the driver, and a foot-lever on the axle extending under the seat.

4. In corn-planters, in combination, the frame suitably supported, the boxes on the frame, the braces connected with the boxes and with the front of the frame, and the brackets on the braces supporting the check-row levers and guide-pulleys.

5. In corn-planters, in combination, the frame suitably supported, the boxes on the frame, the braces connected with the boxes and with the front of the frame and brackets on the braces, and the horizontal bifurcated levers on the brackets connecting directly with the dropping mechanism of the boxes.

6. In corn-planters, in combination, a bifurcated lever, a ratchet draw-bar connected with the lever, a vertically-rotating ratchet-wheel with which the bar engages, and crown-gear on the ratchet-wheel in mesh with teeth on the periphery of the horizontal drop-plate.

7. In corn-planters, in combination, a bifurcated lever, a ratchet draw-bar connected with the lever, a vertically-rotating ratchet-wheel with which the bar engages, crown-gear on the ratchet-wheel in mesh with teeth on the periphery of the horizontal drop-plate, spur-gear integral with the ratchet-wheel, a spur-pinion in mesh with the spur-gear, and a cam-cylinder adapted to rotate with the pinion and impart oscillatory motion to the second drop-valve.

8. In corn-planters, in combination, a bifurcated lever, a ratchet draw-bar connected with the lever, a vertically-rotating ratchet-wheel with which the bar engages, crown gear on the ratchet-wheel in mesh with teeth on the periphery of the horizontal drop-plate, and a stop in position to arrest the motion of the dropping mechanism by an impingement of the bar upon the longer face of the ratchet-teeth.

9. In corn-planters, in combination, a brace connected with a seed-box and with the frame and having a series of bolt-holes, a bracket detachably secured to the brace and carrying a check-row lever and guide-pulleys, and a ratchet-operating bar having a series of holes at intervals and detachably secured to the end of said check-row lever.

10. In corn-planters, in combination, the dual check-row mechanism connected by the transverse shaft, each part comprising a horizontal bifurcated lever, a ratchet-bar connected with the lever, a vertically-rotating ratchet-wheel with which the bar engages, and crown-gear on the ratchet-wheel in mesh with teeth on the periphery of the drop-plate.

11. In corn-planters, the guide mechanism for check-row lines, comprising the frame carrying the approximately-vertical fingers, the pulley-frame having a lateral lug and hinged to the finger-frame, with the pulleys normally resting in an inverted position, and a catch on the finger-frame adapted to hold the pulley-frame in an operative position by sliding over said lug, as set forth.

12. In corn-planters, the covering mechanism comprising the presser-foot and the laterally-contiguous and rearwardly-extended cutter.

13. In corn-planters, the covering mechanism comprising the transversely plane and longitudinally convex pressing-surface, and the laterally-adjacent and rearwardly-extended cutter.

14. In corn-planters, the covering mechanism comprising the presser-foot and the laterally-contiguous and rearwardly-extending cutter having its rear portion curved toward the path of the presser-foot.

15. In corn-planters, the covering mechanism comprising the presser-foot and the laterally-contiguous and rearwardly-extended cutter having a common pivotal connection with the planter-shank.

16. In corn-planters, the covering mechanism comprising the presser-foot and cutter pivoted to the shank of the planter, and means readily accessible to the driver for regulating the pressure of the foot and cutter against the ground.

17. In corn-planters, the covering mechanism comprising the foot and cutter pivoted to the shank of the planter, and means readily accessible to the driver for imparting a greater or less degree of yielding pressure to the foot and cutter.

18. In corn-planters, the covering mechanism consisting in the combination of the foot and the cutter pivoted to the planter-shank, the crank-shaft with the lock-lever in reach of the driver, the rod extending from the crank through the frame of the foot and cutter, and the compression-spring between the frame and the head of the rod.

19. In a check-row planter, a check-wire lever adjustably connected with the frame and adjustably and directly connected with the ratchet-bar of the dropping mechanism, substantially as specified.

20. In a check-row corn-planter, and in combination with a geared drop-plate of the same, a companion gear meshing with the drop-plate and provided with ratchet-teeth having elongated faces, and a ratchet-bar having a projection adapted to take against the vertical faces of the ratchet and extended to bear upon and along the elongated faces of the ratchet-teeth, and a stop, substantially as described, to lock the bar against the elongated face of the ratchet, substantially as specified.

21. In a planter, and in combination with the dropping mechanism thereof, a covering device, and a following soil-loosening device connected directly to the covering device, substantially as specified.

22. In a planter, and in combination with the dropping mechanism thereof, a yieldingly-pressed covering device, and a following soil-loosening device connected directly to the covering device, whereby the action of both is yieldingly performed, substantially as specified.

23. In a check-row corn-planter, a crank-axle, a seed-dropping and a check-wire operating mechanism for the same, an interposed frame-work pivotally connected with the axle, runners secured to the frame, and wheels mounted on the axle, and mechanism for raising and lowering the axle, substantially as specified.

24. In a check-row corn-planter, and in combination with the seed-dropping mechanism thereof, and with the frame supporting the same, a cranked axle, and a lever extending from the same rearwardly and beneath the driver's seat located in rear of the axle, substantially as specified.

25. In a planter, and in combination with the seed-boxes and frame thereof, and with the front marker-beam, a brace connecting the seed-boxes and frame, and provided with a bracket for the marker-beam, substantially as specified.

In testimony whereof we affix our signatures in presence of two witnesses.

FELIX B. TAIT.
JOHN GROSS.

Witnesses:
L. P. GRAHAM,
C. C. CLARK.